June 20, 1967     C. J. NELSON ETAL     3,327,099
UNIVERSAL ELECTRONIC GLIDE SLOPE COMPUTER
Filed Oct. 30, 1963     2 Sheets-Sheet 1

INVENTORS
CARLTON J. NELSON
HARRY B. GRIDER
DONALD N. SPANGENBERG
JAMES E. DAVIS
ROBERT C. HAINES

BY
ATTORNEY

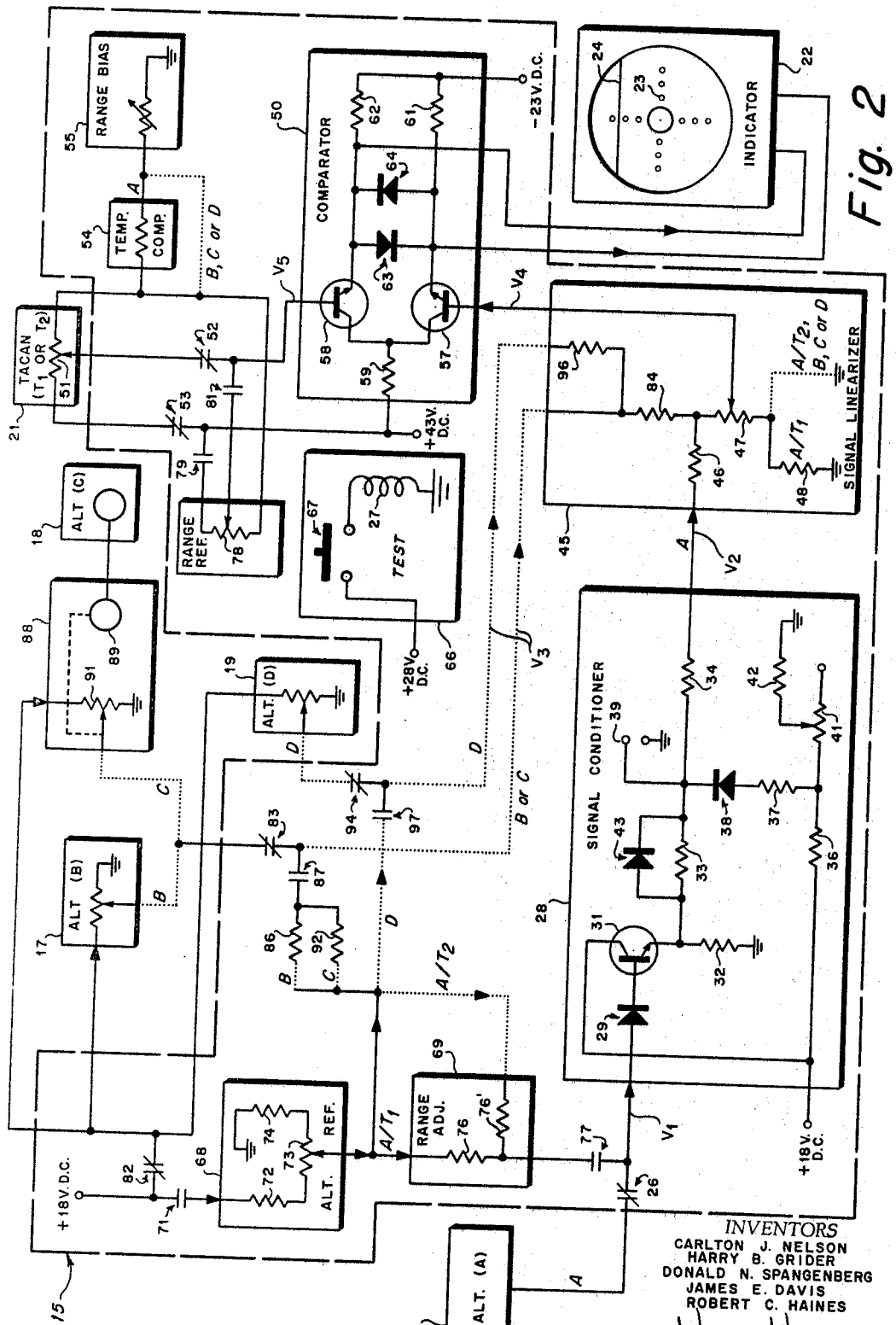

United States Patent Office 3,327,099
Patented June 20, 1967

3,327,099
UNIVERSAL ELECTRONIC GLIDE SLOPE COMPUTER
Carlton J. Nelson, Furlong, Harry B. Grider, Ivyland, Donald N. Spangenberg, Southampton, James E. Davis, Philadelphia, and Robert C. Haines, Quakertown, Pa., assignors to the United States of America as represented by the Secretary of the Navy
Filed Oct. 30, 1963, Ser. No. 320,230
9 Claims. (Cl. 235—150.22)

The invention described herein may be manufactured and used by and for the Government of the United States of America for governmental purposes without the payment of any royalties thereon or therefor.

The present invention relates to a glide slope computer for aircraft and more particularly to a universal glide slope computer for capturing a glide slope light beam used in a visual mode aircraft landing system.

The present mode for landing aircraft on carriers is generally of the visual type. For example, a mirror or Fresnel lens mounted on the carrier deck projects a light source in a diverging beam out along a desired glide slope for landing aircraft. When an approaching aircraft intersects the light beam, the pilot is able to guide the aircraft down the beam as he observes the vertical position of the light source in the mirror or Fresnel lens relative to a reference mark. With no ceiling and maximum visibility, the visual mode can be utilized for the pilot at a distance about one mile from the aircraft carrier although the light beam can be seen at much greater distances. At one mile, the beam height is between 115 and 160 feet. The aircraft is first brought into the light beam envelope by a carrier control approach or CCA mode which involves voice communication with the pilot beginning when the aircraft is about 30 miles from the carrier and at 20,000 feet altitude. Obviously, the rate at which aircraft can be brought down onto the carrier is limited by the CCA mode.

Automatic glide slope computer equipment in the prior art have been found incompatible with existing aircraft instrumentation, too large for light aircraft, or too expensive for the marginal improvement they afford over the voice communication CCA mode briefly described above. For example, a conventional instrument landing system or ILS requires radio transmitters positioned from the landing strip at distant ground points, hence it would not be feasible for carrier landings. Another system continuously measures the slant range and altitude of the aircraft from the landing strip. The actual altitude is compared to a predetermined altitude based on the slant range and the error signal is displayed thereby enabling the pilot to fly the aircraft down a predetermined altitude gradient. The latter system fails to recognize that there are many types of altimeters, distance measuring equipment, and indicators now existing in aircraft which must be individually modified, often involving major re-design, in order to incorporate glide slope computer functions. A specially designed altimeter-computer must be provided in order to meet the specific requirements for each type of aircraft. Existing altimeters, distance measuring equipment and indicators become useless after being replaced by the prior art equipment. Such a replacement program for military aircraft is logistically unsound.

Accordingly, it is an object of the present invention to provide a universal glide slope computer for aircraft which can be directly connected to a wide variety of existing altimeters, distance measuring equipment, indicators, and combinations thereof with no modifications thereto.

Another object of the invention is to provide a universal glide slope computer which makes each measuring or indicating group of components compatible with any other measuring or indicating group of components used in modern aircraft.

Still another object of the invention is to provide a universal glide slope computer which requires relatively few elements thereby increasing reliability, which is relatively small thereby occupying very little aircraft space, which can be quickly added to any aircraft presently used in the Navy fleet, and which involves a minimum of external electrical connections.

A further object of the invention is to provide a universal glide slope computer which is extremely reliable and sturdy, compact, and relatively simple and inexpensive to manufacture and maintain.

Various other objects and advantages will appear from the following description of one embodiment of the invention, and the most novel features will be particularly pointed out hereinafter in connection with the appended claims.

In the drawings:

FIG. 2 illustrates, partly in block diagram and partly in schematic diagram, one embodiment of the universal glide slope computer;

Figure 3:
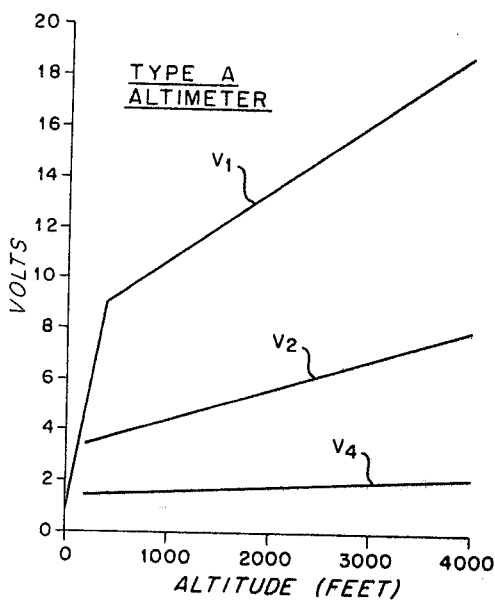
Figure 4:
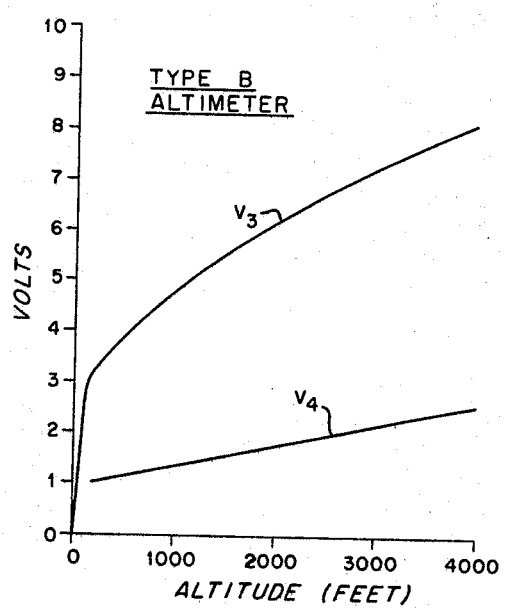

FIG. 3 graphically represents typical voltage characteristics for the inventive embodiment shown in FIG. 2; and FIG. 4 graphically represents typical voltage characteristics for the inventive embodiment with alternate electrical connectors shown in FIG. 2.

Figure 1:
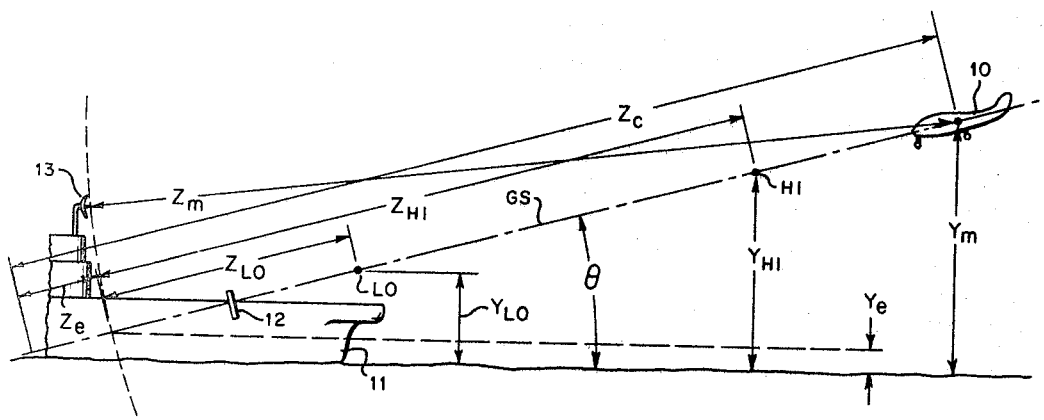
FIG. 1 is a pictorial representation of an aircraft approaching a carrier on the glide slope.

Referring first to FIG. 1, an aircraft 10 is shown approaching a carrier 11 along a glide slope GS generated for the visual landing mode by a mirror or Fresnel lens 12. The mirror or lens 12 is stabilized to maintain a constant glide slope angle $\theta$ from the horizontal irrespective of carrier roll or pitch. The angle $\theta$ is shown greatly exaggerated, but is actually about 3.5° for most aircraft. Of course, altitude $Y_m$ is measured from sea level, and slant range $Z_m$ is measured to a carrier TACAN antenna 13. The slant range $Z_m$ must be corrected by an amount $Z_e$ which is equal to $Y_e/\sin \theta$ where $Y_e$ is equal to elevation from sea level where an arc of radius $Z_m$ intersects the glide slope GS. Thus, corrected slant range $Z_c$ may be equated to the measured altitude $Y_m$ as follows:

$$Y_m = Z_c \sin \theta \quad (1)$$

The altitude $Y_m$ and slant range $Z_c$ are both compared in the glide slope computer of the present invention as D.C. voltages and are equated as follows:

$$k_1 Y_m = K_2 Z_c \sin \theta \quad (2)$$

where $k_1$ = volts per foot altitude, and
$k_2$ = volts per foot corrected slant range.

Transposing, $$\left(\frac{k_1}{k_2 \sin \theta}\right) Y_m = Z_c \quad (3)$$

As output voltages for comparison, these terms will be referred to as $$V_4 = V_5 \quad (4)$$

Referring now to FIG. 2, implementation of these equations into the universal glide slope computer of the present invention, indicated generally by the numeral 15 and the elements included in the area bounded by the broken line will now be described. It is contemplated that a power supply, not shown, also be included as part of the computer 15. The two basic input parameters received by the computer 15 are altitude $Y_m$ and slant range $Z_m$. There is one output signal which is glide slope angle error $\theta_e$. The altitude input is obtained from one of four distinct types of altimeters herein identified as types A, B, C and D, and are illustrated in FIG. 2 by the numerals 16, 17, 18 and 19, respectively. Slant range input is provided by a TACAN unit 21 which may be either of two distinct types, $T_1$ or $T_2$. The computer 15 is illustrated electrically connected for operation with altimeter type A and TACAN type $T_1$. Alternate connections for using altimeter type B, C or D and TACAN type $T_2$ are shown in dotted lines and further identified by corresponding letters of the alphabet. When altimeter 17 is used instead of altimeter 11, electrical connections identified by the letter A are removed and connections identified by the letter B are added. Similar modifications are indicated for altimeters 18 and 19 and TACAN $T_2$.

The output signal from the computer 15 is connected to an indicator 22 which is usually of the type having a fixed horizontal reference 23 and a vertically movable index 24. Upward movement of the index 24 displays the glide slope angle error $\theta_e$ above the set glide slope angle $\theta$, and downward displacement indicates the glide slope angle error $\theta_e$ below the desired glide slope angle $\theta$.

Altimeter 16, which is of type A, has a voltage output $V_1$ indicative of the altitude $Y_m$ and connects through a normally closed contact 26 of a relay coil 27 to the signal input of a signal conditioner 28. The AN/APN–141 altimeter used in certain Navy aircraft is of the type A altimeter having an output voltage $V_1$ as shown in FIG. 3. It should be noted that the voltage $V_1$ varies linearly with altitude over the whole range, but changes slope at about 400 feet. The altitude signal $V_1$ to the conditioner 28 passes through a diode 29 to the base of a transistor 31 whose collector is connected to a $+18$ volt D.C. supply. The diode 29 prevents current flow back to the altimeter 16 due to any leakage from the transistor base. The emitter of the transistor 31 is connected to ground through a resistor 32 and is further connected through serial resistors 33 and 34 to the signal conditioner output represented by the voltage $V_2$. The $+18$ volt D.C. supply is also fed through serially connected resistors 36 and 37 and a diode 38 to the common connection between the serial resistors 33 and 34, thereby providing a plus bias at the emitter of the transistor 31 which is lower than between the resistors 33 and 34. The diode 38 acts as an isolater for the signal conditioner output signal $V_2$. The bias between the resistors 33 and 34 can be measured at a terminal 39 and can be adjusted by a variable resistor 41 connected at one end between the resistors 36 and 37 and the wiper connected to ground through a resistor 42.

Utilizing the present invention, the procedure is for the pilot to bring the aircraft from about 30 miles range and 20,000 feet altitude to about 10 miles and 2,000 feet using the aircraft's rate of descent display and the CCA. At 2,000 feet altitude the glide slope computer 15 is designed to become automatically operative and aid the pilot in attaining an aircraft glide slope GS leading into the glide slope light beam. Most altimeters, such as type A, are designed with nonlinear voltage outputs in order to permit more precise indications at the low altitudes while permitting less precise indications at very high altitudes. This accounts for the change in slope of $V_1$ in FIG. 3, as noted earlier. The operative altitude range of the computer 15 straddles the slope transition point of $V_1$, so it is necessary to provide means for removing the gradient transition. This is accomplished in the signal conditioner 28 by means of the resistor 33 and a shunting diode 43. The diode 43 is nonconducting for voltage variations below the gradient transition because the voltage between resistors 33 and 34 is *more* positive than at the emitter; hence resistor 33 is effective with resistor 34 to further attenuate the voltage gradient at the output of the signal conditioner 28. At or above the voltage gradient transition point, the voltage between resistors 33 and 34 is *less* positive than at the emitter, and the diode 43 becomes conducting. Resistor 33 is thereby shunted and the only slope attenuation is due to resistor 34. The resultant output voltage $V_2$ of the signal conditioner 28 is shown in FIG. 3 as being linear from about 200 to 4000 feet altitude with no slope transition therebetween.

The output signal $V_2$ from the signal conditioner 28 is connected to one of three input terminals of a signal linearizer 45. The other two inputs are used for types B, C and D altimeters discussed hereinbelow. Using altimeter type A and TACAN type $T_1$, the input signal $V_2$ to the linearizer 45 is connected to three serially connected resistors 46, 47 and 48 to ground. The resistor 47 is variable and the wiper thereof becomes the output connection from the signal linearizer 45 with an output voltage $V_4$. The combined variable resistance of the resistors 46 and 47 provide means for further attenuating the voltage gradient as shown by the difference in slope of $V_2$ and $V_4$ in FIG. 3. The combined effects of the signal conditioner 28 and the signal linearizer 45 determines the constant $k_1$ in Equation 3 above.

The output voltage $V_4$ from the signal linearizer 45 is fed to one of two signal inputs of a voltage comparator 50. The other signal input is a voltage $V_5$ from the TACAN unit 21 which is of the type $T_1$. The TACAN unit 21 includes an output potentiometer 51 whose wiper position determines the output $V_5$ and connects through a normally closed contact 52 of the relay coil 27 to the other input of the comparator 50. The resistor of the potentiometer 51, a temperature compensator 54, and a range bias resistor 55 are serially connected between a $+43$ volt D.C. supply and ground. The temperature compensator 54 comprises a resistor with a positive temperature coefficient and is used only in conjunction with the signal conditioner 28 in order to compensate for the effects of temperature on the elements therein. The resistance value of the compensator 54 is different for types $T_1$ and $T_2$ TACAN units due to differences in operative ranges of the TACAN types $T_1$ and $T_2$. The AN/ARN–21 and 21B, and AN/ASQ–56, –57, –58 and –19 TACAN units used in certain Navy aircraft are of type $T_1$ which has a linear potentiometer 51 for a 200 mile total span. The AN/ARN–52 TACAN unit, also used in Navy aircraft, is of type $T_2$ and has a linear output potentiometer 51 for a 300 mile total span.

As noted earlier in connection with FIG. 1, the slant range $Z_m$ must be corrected an amount $Z_e$. The range bias resistor 55 is adjusted to accomplish this, and in effect modifies the output voltage $V_5$ so that it is proportional to the corrected slant range $Z_c$. The proportionality factor $$k_1/k_2 \sin \theta$$

is coarsely determined by the selection of appropriate resistance. Precise selection of this factor is subsequently obtained by appropriate adjustment of the range bias resistor 55 and the linearizer potentiometer 47. The adjusting procedure is described in more detail hereinbelow.

The comparator 50 receives the altitude and range voltages $V_4$ and $V_5$ at the base of respective transistors 57 and 58. The collectors are connected in common to a resistor 59 which in turn is connected to a $+43$ volt D.C. supply. The emitters of the transitors 57 and 58 are respectively connected to a $-23$ volt D.C. supply through resistors 61 and 62. The indicator 22 is connected between the emitters of the transistors 57 and 58 so that the index 24 will move up or down from the reference 23 according to voltage difference between $V_4$ and $V_5$. Shunting diodes 63 and 64 provide protection to the indicator against voltage differences in excess of the input rating of the indicator 22.

Fine adjustment of the factor $$k_1/k_2 \sin \theta$$

is made as follows. Two calibration points identified as LO and HI are selected at spaced intervals along the length of a desired glide slope angle $\theta$ as shown in FIG. 1.

The altimeter 16 and TACAN unit 21 are "forced" to produce indications corresponding to $Y_{Lo}$ and $Z_{Lo}$. Then the range bias resistor 55 is adjusted until the movable index 24 is centered over horizontal reference 23 of the indicator 22. The altimeter 16 and TACAN unit 21 are then "forced" to indicate $Y_{Hi}$ and $Z_{Hi}$, and the linearizer potentiometer 47 is similarly adjusted until the index 24 is again centered. This procedure is repeated until there is no further displacement of the index 24 for either the Hi or Lo calibration points. The computer 15 is thus precisely adjusted for the selected glide slope angle $\theta$. In actual flight, any deviation in measured slant range $Z_m$ or altitude $Y_m$ in the aircraft from their computed values as the pilot approaches the visibility threshold of the glide slope light beam generated by the mirror or lens 12 will appear as a glide slope angle error $\theta_e$ on the indicator 22. The direction and magnitude of displacement of the movable index 24 from the center will dictate the amount and direction of correction in aircraft position which must be executed.

A component check-out system is provided in the universal glide slope computer 15 in which selected altitude and range signals are simulated and substituted for the actual signals from the altimeter 16 and the TACAN unit 21. This is accomplished by a test unit 66 in which the relay coil 27 is connected, in series with a push button switch 67, between a +28 volt D.C. supply and ground. The simulated altitude is selected on an altitude reference unit 68. Due to the range span difference of types $T_1$ and $T_2$ TACAN, the altitude reference signal is further modified by a range adjuster 69. More specifically, a normally open contact 71 of the relay coil 27, resistors 72, 73 and 74 are series-connected between a +18 volt D.C. supply and ground. The resistor 73 is a potentiometer whose wiper comprises the output of the reference unit 68 and connects to the first of two input terminals of the range adjuster 69. A resistor 76 in the adjuster 69 is connected between the first input terminal and the output terminal thereof. The range adjuster output connects to the first signal input $V_1$ of the signal conditioner 28 through a normally open contact 77 of the relay coil 27.

The TACAN unit 21 output is simulated by a range reference voltage divider 78 having one leg thereof connected through a normally open contact 79 to the +43 volt D.C. supply. The other leg is connected to ground through the series-connected temperature compensator 54 and range bias resistor 55. The voltage divider wiper in turn is connected through a normally open contact 81 to the input of the comparator at the base of the transistor 58. The wiper elements 73 and 78 are each manually adjusted at the time of installation to simulate a glide slope angle error such that the index 24 will be vertically displaced from the reference 23 and aligned with the first dot above the reference 23. For subsequent checkouts, the pilot simply depresses the push button switch 67 energizing the relay coil 27. Among others, normally closed contacts 26, 52 and 53 open to disconnect the altimeter 16 and TACAN unit 21 as the basic inputs, and normally open contacts 71, 77, 79 and 81 close to provide reference signals as basic inputs for comparison. A fault is indicated if the index 24 does not deflect to the first dot above the reference 23.

As described above, the resistor 76 adjusts for the range span of type $T_1$ TACAN. When type A altimeters are used in combination with type $T_2$ TACAN, the output of the altitude reference unit 68 is connected instead through a different resistor 76'. Further span compensation for both type $T_2$ TACAN and types B, C and D altimeters is provided by the direct ground shunt from the resistor 47 around resistor 48 of the signal linearizer 45.

Altimeter 17, which is of type B, has a potentiometer voltage output $V_3$ indicative of the altitude $Y_m$. The AN/APN–22 radar altimeter of 0–20,000 feet range used in certain Navy aircraft is of this type. A +18 volt D.C. supply is connected through a normally closed contact 82 and the output potentiometer of the altimeter 17 to ground. As noted previously, when type B altimeters are used instead of type A altimeters, dotted electrical connections identified by the letter B are made instead of those identified as A in FIG. 2. Therefore, it is apparent that the potentiometer wiper of the altimeter 17 is connected through a normally closed contact 83 to a second input terminal of the linearizer 45. This terminal connects through a resistor 84 to the common connection between the resistor 46 and one end of the potentiometer 47. The other end of the potentiometer 47 is connected to ground. Unlike type A altimeters, there is no abrupt slope transition over the operative range of the altimeter 17 as would require the signal conditioner 28. As illustrated in FIG. 3, the slope of the output voltage curve $V_3$ is nonlinear throughout the desired operating range of the computer. The value of resistors 84 and 47 is selected to provide an effective resistance which will produce a linear output voltage $V_4$ for the nonlinear voltage $V_3$ over the operative range of the glide slope computer 15. Signal conditioner 28 not being in the circuit, no temperature compensation is necessary. Therefore the range bias resistor 55 is connected directly to the TACAN potentiometer 51 instead of to the teperature compensator 54. The output of the altitude reference 68 is now connected through a resistor 86 and a normally open contact 87 to the second input of the linearizer 45. Calibration and fault testing procedures when using altimeter 17 are identical to those described for altimeter 16 and TACAN unit 21.

The altimeter 18, which is of the type C, has a synchro output signal which is transformed into an output voltage $V_3$ by conventional servo techniques in an adaptor 88. The AN/APN–120 radar altimeter used in certain Navy aircraft is of this type. A synchro receiver 89 positions the wiper of a potentiometer 91 supplied from the +18 volt D.C. supply through the normally closed contact 82. The wiper, in turn, is connected through the normally closed contact 83 to the second input as described for the altimeter 17. The potentiometer 47 is grounded in the manner described for type B altimeters, but a resistor 92, instead of resistor 86, is connected between the altimeter reference 68 and the normally open contact 87. This difference in resistance is provided due to the difference in the altimeter characteristics. The temperature compensator 54 is by-passed as described for altimeter 17, type B.

Altimeter 19, which is of the type D, has a potentiometer voltage output characteristic similar to the type B altimeter 17 except as to total altitude range. The AN/APN–117 radar altimeter of 0–1000 feet range used in certain Navy aircraft is of this type. The potentiometer wiper output is directly connected to the third input terminal of the signal linearizer 45 through a normally closed contact 94. This third input connects to one end of a scaling resistor 96 which then connects at the other end to the input of the resistor 84. The output from the altitude reference 68 is connected directly to a normally open contact 97. Again, the resistor 47 of the signal linearizer 45 is connected directly to ground, and the temperature compensator 54 is by-passed.

Calibration and fault testing procedures for altimeters 18 or 19 are identical to those described above in connection with altimeter 16 and TACAN unit 21.

Many of the advantages derived from the invention should now be apparent. For example, the invention provides a single glide slope computer unit capable of being directly connected to a large variety of existing altimeters, distance measuring equipment, and indicators used in military aircraft with no modifications required thereof. The novel computer unit of the present invention makes each input or output component compatible with any other input or output component. It utilizes a minimum of elements thereby increasing reliability. It is relatively small, occupying very little aircraft space, and can be quickly added to many aircraft types, such as existing in the Navy fleet, with a minimum of external cable connections.

It should be further noted that the invention directly compares altitude with range and produces an error signal on a single type of indicator as a function of the difference between the two signals. This avoids characterized cams or computers for each type of altimeter and permits a greatly expanded display scale similar to the mirror or lens reference viewed in the visual mode.

What is claimed is:

1. A universal glide slope computer for capturing a glide slope light beam used in visual aircraft landing systems, comprising:

a signal conditioner having an input adapted to receive the output from a first type of altimeter having a non-linear voltage rate with an abrupt change in rate within the operative altitude of said computer, said signal conditioner including means for converting the abrupt rate change to a smooth non-linear output signal throughout the operative range of said computer;

a signal linearizer having a first input connected to the output of said signal conditioner and including means for producing an output voltage which is linearly proportional to the altitude measured by the altimeter;

a comparator having a first input connected to the output of said signal linearizer and a second input adapted to receive the output from a distance measuring unit of the type having a linear voltage rate within the operative range of said computer, said comparator including means for comparing said first and second input voltages and for producing an output voltage indicative of the difference between said inputs;

indicator means having an input connected to the output of said comparator for providing a visual display of said comparator input difference;

a range bias means manually adjustable for modifying the output of said distance measuring unit;

a temperature compensator having an input connected to the output of said range bias means and including means for producing an output signal automatically compensating for the effects of temperature variation in said signal conditioner, the output of said temperature compensator being adapted to modify said distance measuring unit output;

said signal linearizer having a second input adapted to receive the output from a second type of altimeter having a non-linear voltage rate;

a synchro adapter adapted to receive the output from a third type of altimeter having a non-linear synchro output voltage rate for producing a voltage at an output which is proportional to the synchro output, said synchro adapter output being selectively connected to the second input of said signal linearizer;

said signal linearizer having a third input adapted to receive the output from a fourth type of altimeter of a range different from said second type of altimeter and having an output voltage which is non-linear throughout its range;

said range bias unit and said signal linearizer each including means for manually adjusting a desired glide slope; and component testing means adapted to be selectively substituted for any of said altimeters and said distance measuring unit for imparting a fault indication on said indicator;

whereby deviations of an approaching aircraft from the desired glide slope will be indicated to the pilot for executing appropriate landing maneuvers.

2. A glide slope computer as set forth in claim 1 wherein said signal conditioner further comprises:

a transistor having the base thereof connected through a first diode to the input of said conditioner, the collector thereof connected to a D.C. supply, and the emitter thereof connected to the output of said conditioner through first and second series-connected resistors;

said D.C. supply being further connected to the common connection between said first and second resistors through a series-connected third resistor and second diode, and a third diode connected in parallel with said first resistor for shunting the latter at a predetermined voltage difference thereacross;

whereby an abrupt change in non-linear voltage rate input is removed at the output of said conditioner.

3. A universal glide slope computer as set forth in claim 1 wherein said signal linearizer further comprises:

a first fixed resistor and a variable resistor connected in series between the first input and the output of said linearizer, a second resistor connected between said second input and the common connection between said first fixed resistor and said variable resistor, and a second fixed resistor connected between the third input and the second input of said linearizer;

whereby a non-linear voltage rate at the input is linear at the output of said linearizer.

4. A universal glide slope computer as set forth in claim 1 wherein said comparator further comprises:

a pair of transistors each having a base respectively connected to said first and second inputs of said comparator, the collectors thereof connected to a D.C. supply, and the emitters thereof connected to the output of said comparator;

whereby any difference in the input voltages appear as an output voltage proportional thereto.

5. A universal glide slope computer for capturing a glide slope light beam used in visual aircraft landing systems, comprising:

a signal conditioner having an input adapted to receive the output from a first type of altimeter having a non-linear voltage rate with an abrupt change in rate within the operative range of said computer, said signal conditioner including means for converting the abrupt rate change to a smooth non-linear output signal throughout the operative range of said computer;

a signal linearizer having a first input connected to the output of said signal conditioner and including means for producing an output voltage which is linearly proportional to the altitude measured by the altimeter;

a comparator having a first input connected to the output of said signal linearizer and a second input adapted to receive the output from a distance measuring unit of the type having a linear voltage rate within the operative range of said computer, said comparator including means for comparing said first and second input voltages and for producing an output voltage indicative of the difference between said inputs;

indicator means having an input connected to the output of said comparator for providing a visual display of said comparator input difference;

a range bias means manually adjustable for modifying the output of said distance measuring unit;

said signal linearizer having a second input adapted to receive the output from a second type of altimeter having a non-linear voltage rate;

a synchro adapter adapted to receive the output from a third type of altimeter having a non-linear synchro output voltage rate for producing a voltage at an output which is proportional to the synchro output, said synchro adapter output being selectively connected to the second input of said second linearizer;

said signal linearizer having a third input adapted to receive the output from a fourth type of altimeter of a range different from said second type of altimeter and having an output voltage which is non-linear throughout its range; and said range bias unit and said signal linearizer each including means for manually adjusting a desired glide slope;

whereby deviations of an approaching aircraft from the desired glide slope will be indicated to the pilot for executing appropriate landing maneuvers.

6. A glide slope computer as set forth in claim 5 wherein said signal conditioner further comprises:

a transistor having the base thereof connected through a first diode to the input of said conditioner, the collector thereof connected to a D.C. supply, and the emitter thereof connected to the output of said conditioner through a first resistance;

said D.C. supply being further connected to said first resistance through a series-connected second resistance; and a second diode connected in parallel with said first resistance for shunting the latter at a predetermined voltage difference thereacross.

7. A universal glide slope computer as set forth in claim 5 wherein said signal linearizer further comprises:

a first fixed resistor connected at one end to the first input of said linearizer, a variable resistor connected between the other end of said first fixed resistor and the output of said linearizer, a second fixed resistor connected between said second input and the common connection between said first fixed resistor and said variable resistor, and a third fixed resistor connected between the third input and the second input of said linearizer.

8. A universal glide slope computed as set forth in claim 5 wherein said comparator further comprises:

a pair of transistors each having a base respectively connected to said first and second inputs of said comparator, the collectors thereof connected to a D.C. supply, and the emitters thereof connected to the output of said comparator.

9. A universal glide slope computer, comprising:

a signal conditioner having an input adapted to receive the output from a first type of altimeter having a non-linear voltage rate with an abrupt change in rate within the operative range of said computer, said signal conditioner including means for converting the abrupt rate change to a smooth non-linear output signal throughout the operative range of said computer;

a signal linearizer having a first input connected to the output of said signal conditioner and including means for producing an output voltage which is linearly proportional to the altitude measured by the altimeter;

a comparator having a first input connected to the output of said signal linearizer and a second input adapted to receive the output from a distance measuring unit of the type having a linear voltage rate within the operative range of said computer, said comparator including means for comparing said first and second input voltages and for producing an output voltage indicative of the difference between said inputs;

indicator means having an input connected to the output of said comparator for providing a visual display of said comparator input difference;

said signal linearizer having a second input adapted to receive the output from a second type of altimeter having a non-linear voltage rate;

a synchro adapter adapted to receive the output from a third type of altimeter having a non-linear synchro output voltage rate for producing a voltage at an output which is proportional to the synchro output, said synchro adapter output being selectively connected to the second input of said signal linearizer;

said signal linearizer having a third input adapted to receive the output from a fourth type of altimeter of a range different from said second type of altimeter and having an output voltage which is non-linear throughout its range.

References Cited

UNITED STATES PATENTS

| | | | |
|---|---|---|---|
| 2,830,291 | 4/1958 | Hecht et al. | 244—77 X |
| 2,841,345 | 7/1958 | Halpert et al. | 244—77 |
| 2,987,275 | 6/1961 | Moncrieff-Yeates et al. | 244—77 |
| 3,052,428 | 9/1962 | Match et al. | 244—77 |

MALCOLM A. MORRISON, *Primary Examiner.*

I. KESCHNER, *Assistant Examiner.*